3,303,004
METHOD FOR DISSOLVING STAINLESS
STEEL MEMBERS
Melvin R. Bennett, Oak Ridge, and George I. Cathers, Knoxville, Tenn., assignors to the United States of America as represented by the United States Atomic Energy Commission
Filed Apr. 6, 1965, Ser. No. 446,135
8 Claims. (Cl. 23—324)

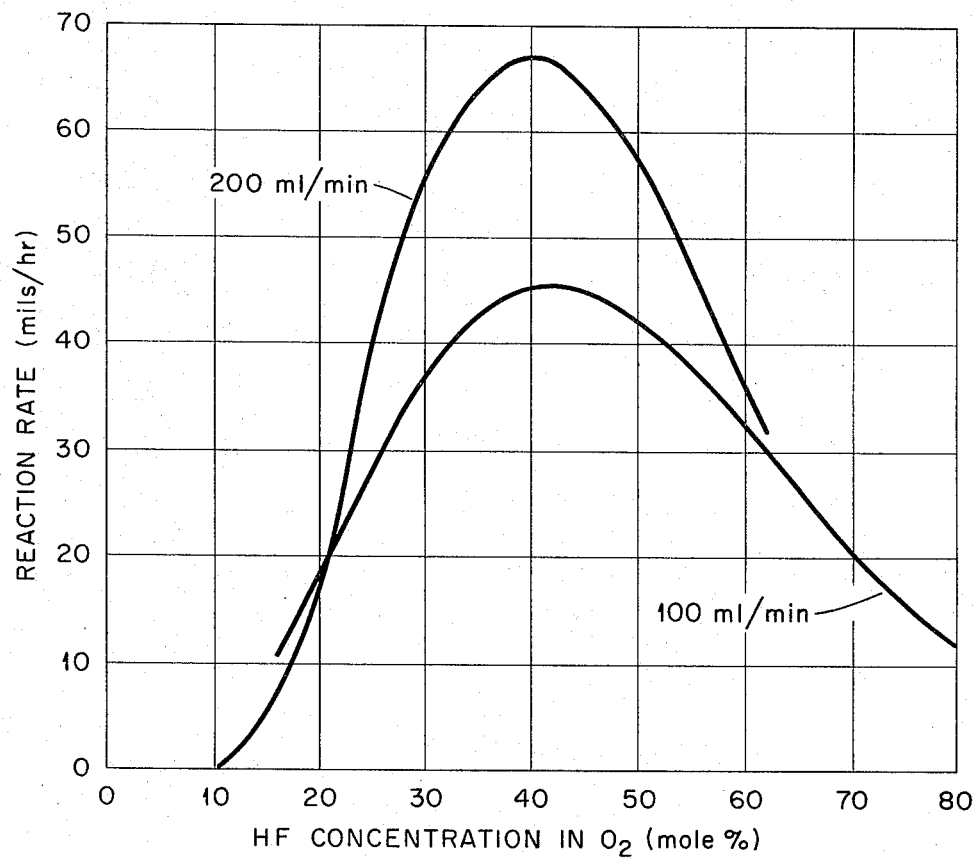

The present invention relates generally to processes for dissolving stainless steel containing members, and more particularly to a process for decladding stainless steel containing nuclear fuels.

Stainless steels have been widely investigated as cladding materials for various nuclear fuels. They are highly suitable for such purposes due to their availability, relatively low cost, ease of fabrication, and strength and corrosion resistance in high temperature aqueous and/or organic environments. This high corrosion resistance to most reactants, while highly desirable in general properties of cladding materials, presents certain problems in providing for decladding of the nuclear fuel during reprocessing operations.

Various mechanical and/or chemical techniques have been employed for decladding stainless steel clad nuclear fuels. For example, stainless steel clad-uranium dioxide fuel tubes have been processed by chopping the fuel element array into short sections followed by aqueous leaching of the fuel values from the cladding in 10 M nitric acid solutions. Such fuels have also been processed by shearing the cladding from the fuel core and then dissolving the exposed core in an aqueous solution. To effect a removal of the cladding by such mechanical means requires elaborate apparatus and, inasmuch as all of the operations must be carried out remotely, maintenance of the equipment becomes quite a problem.

In addition to the various mechanical removal means, a number of chemical techniques for cladding removal, such as the Darex or Sulfex processes, have been developed. Briefly, the Darex process effects dissolution of the stainless steel cladding material in dilute aqua regia (2 M HCl-5 M $HNO_3$ acid feed), whereas the Sulfex process utilizes dilute sulfuric acid. While these aqueous processes have been successful in removing stainless steel cladding from various fuel elements, the dissolution rates have generally been quite low as well as the processes being quite corrosive, thus making alternate routes highly desirable.

A recent development involved the use of solid metal fluoride promoters in an oxygen atmosphere to effect removal of the stainless steel cladding from spent nuclear fuels. There it was found that contacting the stainless steel clad fuel elements with oxygen alone was ineffectual in destructively oxidizing the stainless steel, and even when oxygen was combined with fluorine gas the reaction rates were still quite low. It was found, however, that when small amounts of a solid metal fluoride, such as aluminum fluoride, were present in an oxidizing atmosphere, acceptable, but erratic, reaction rates were obtained, with the erratic results probably being attributed to uneven distribution of the metal fluoride in the bed. While this development provided acceptable reaction rates and low corrosive attack on the container apparatus, the requirement of providing metal solid additives within the process system imposed certain restrictions on the ultimate utility of the process. This may be seen, for example, where such a decladding operation is proposed as a head-end treatment for an aqueous reactor fuel reprocessing operation. In such an operation the requirement of maintaining solid metal fluoride particles in a stationary position surrounding the fuel element while simultaneously passing an oxidizing gas therethrough becomes a problem due to an absence of any supporting media to contain the solids therein. Thus, while such a process for decladding stainless steel clad nuclear fuels is well suited for incorporation in a fluidized bed, it is not readily adaptable to other fuel reprocessing operations. With the advent of a variety of nuclear fuels (uranium and plutonium metals, oxides, and carbides) it is highly desirable to have a head-end operation which may conveniently be integrated with the various fuel recovery processes, such as aqueous and/or volatility fuel reprocessing operations, to accommodate the various types of fuels likely to be encountered.

It is, therefore, a general object of this invention to provide a method for dissolving stainless steel containing members.

Another object is to provide a method for decladding stainless steel clad nuclear fuels.

Another object is to provide a head-end fuel recovery process for reactor fuels having stainless steel as a cladding or matrix material.

A further object is to provide a method whereby stainless steel clad nuclear fuels may be processed by an aqueous and/or a volatility type reprocessing technique.

Still a further object is to provide a simple and efficient method for decladding stainless steel containing nuclear fuels wherein the cladding is destructively oxidized by a gaseous mixture of $HF-O_2$.

A still further object is to provide a method wherein these objects are achieved without the use of solid additives.

Other objects and advantages of the present invention, which will be apparent to those skilled in the art, are accomplished by contacting the stainless steel containing member with a gaseous reaction mixture of anhydrous HF and an oxygen-containing gas at a temperature between 550°–650° C. thereby oxidizing the therein-contained stainless steel. It has been found that a gaseous, anhydrous mixture of $HF-O_2$ provides excellent reaction rates for destructive attack of stainless steel containing members at temperatures within this range. While acceptable reaction rates were obtained with gas compositions containing HF concentrations between 20 and 80 volume percent (v/o), the present inventors have discovered, quite unexpectedly, that when the gas composition contains about 40 v/o HF, high reaction rates, to wit—above 60 mils/hr.—were obtained. With respect to the $HF-O_2$ gas mixture, it has also been found that the HF is not consumed to any great extent in the oxidation reaction, but acts as a catalyst. While the exact mechanism by which the stainless steel is removed is not completely understood, it is thought that the HF, acting as a catalyst, destroys the passivity of the stainless steel, possibly by the formation of chromium fluorides, such as $CrF_3$, which in turn is converted to the oxide. The reaction product between the $HF-O_2$ gas mixture and the stainless steel is a mixture of oxides, not fluorides as might be expected. However, if the exposure time of the formed oxides to the $HF-O_2$ gas stream is for an extended period, then the oxides are slowly converted to fluorides.

It will be appreciated that the stainless steels hereinbefore mentioned include any of the more common types of stainless steels, such as the austenitic types. Inasmuch as it is postulated that the destructive attack of the stainless steel is effected by a reaction between HF and chromium, it may be seen that any of the stainless steels, which contain an appreciable chromium content, are intended to be within the scope of this process. Type 300 series nickel steels containing 18% Cr-2% Ni and minor amounts of other elements and type 400 series chromium steels may, for example, conveniently be processed by this process.

In carrying out the operation of this invention the oxidation of the stainless steel cladding may be effected by contacting the elements with any oxygen-containing gas which is chemically compatible with the process system, such as atmospheric air. However, it has been found that when HF-air mixtures were used the reaction rates were lower than when pure oxygen was employed. This is generally attributable to the dilution of the oxygen in the air mixture. Where an HF-oxygen mixture is employed it may be combined with an inert gas, such as argon or nitrogen. This may be desired when, for example, the minimum fluidizing velocity of the HF-oxygen mixture necessary creates excessive heats of reactions, requiring that the concentrtaions of reactant gases be cut back which may conveniently be accomplished by combining with an inert gas. From the accompanying figure it may be seen that a preferred gas composition may comprise 40 v/o HF-60 v/o oxygen. Where it is desired to combine HF-$O_2$ mixture with an inert gas such as nitrogen, a gas composition of 40 v/o HF-40 v/o oxygen-20 v/o nitrogen is preferred.

The reaction between the stainless steel and the HF-$O_2$ mixture appears to be quite complex. For example, where a stainless steel clad $UO_2$ spent fuel element is processed, the HF-$O_2$ mixture converts the elemental constituents of the stainless steel, i.e., the iron, chromium and nickel, initially to the corresponding oxides ($Fe_2O_3$, $Fe_3O_4$, $NiO$, $Cr_2O_3$), and it has been found that where the exposure time to the HF-$O_2$ mixture is sufficiently prolonged the respective oxides are converted to the corresponding fluorides, i.e., $FeF_3$, $CrF_3$, $NiF_2$. Generally, neither the oxides nor the fluorides, if any are formed, are volatile at the temperatures at which the decladding operation is performed (550°–650° C.). Although, however, two fluorides of chromium, $CrF_4$ and $CrF_5$, are volatile at these temperatures, there is not much chromium volatilization during the HF-$O_2$ treatment, indicating that perhaps non-volatile $CrF_3$, and not $CrF_4$ or $CrF_5$, is formed. The effect of this upon subsequent fuel recovery will be described in greater detail hereinafter.

Upon exposure of the fuel core, the $UO_2$ and $PuO_2$ present react with the HF-$O_2$ gas mixture as follows:

(1) $UO_2 + 4HF \rightarrow UF_4 + 2H_2O$    $\Delta H = -446$ kcal./mole
(2) $3UO_2 + O_2 \rightarrow U_3O_8$    $\Delta H = -284.6$ kcal./mole
(3) $U_3O_8 + 8HF \rightarrow UF_4 + 2UO_2F_2 + 4H_2O$
(4) $PuO_2 + 4HF \rightarrow PuF_4 + 2H_2O$ The decladding operation is carried out at an elevated temperature. For this a range of temperature between 550° C. and 650° C. have been found quite suitable. When dissolution temperatures below 550° C. were used, the reaction rates were quite low, and tests indicate that temperatures above 650° C. may actually reduce the reaction rates. This latter finding is not completely understood. In addition to these considerations, it generally is not desirable to carry out the decladding operation at temperatures above 650° C. due to the high corrosive attack of the reactants upon the process apparatus; hence the range between 550° C. and 650° C., with a preferred temperature of about 600° C., is quite suitable.

It has been found that any moisture present in the gas mixture retards the rates of reactions to some extent. Thus, it is preferred that the HF-$O_2$ gas mixture be essentially free from any moisture. As may be seen from reaction (3) supra, water is a by-product of the reaction between the uranium oxide and HF. It would thus seem apparent that the generation of water by this reaction would seriously retard, if not stop, the destructive oxidation of the remaining stainless steel cladding. The reaction rates, however, are so high that some retardation from the oxide-water formation does not seriously affect the dissolution operation. This minimal effect may be partially explained, additionally, by the fact that the stainless steel during oxidation breaks off in large portions which, probably due to their being heavier than the smaller, more uniform $UO_2$ particles, collect along the bottom of the bed, providing an immediate contact with the incoming anhydrous gaseous reaction mixture.

The present invention is highly versatile in that it may be employed as a head-end treatment for either aqueous and/or volatility type fuel reprocessing operations. Additionally, the HF-oxygen gaseous mixture has been found not only to effectively destroy the stainless steel cladding, but also to convert the $UO_2$ and $PuO_2$ (if present) to form a suitable for subsequent fluorination. This means that one less process step is required when using HF-oxygen as required when using other techniques, such as a chloride volatility. For example, if an aqueous reprocessing operation were used, the stainless steel containing nuclear fuel, such as stainless steel tubular element containing sintered $UO_2$ pellet fuel element, would first be processed to remove the cladding. In accordance with this invention the fuel element would then be contacted with a gaseous anhydrous mixture of HF-$O_2$, preferably a 40 v/o HF-60 v/o $O_2$ mixture, at a temperature between 550° C. and 650° C. Upon removal of the stainless steel cladding the system could be flushed and the dissolution of the $UO_2$ pellets effected by contacting the pellets with a strong inorganic acid, such as $HNO_3$ in the same reactor or alternatively the pellets may be mechanically transferred to another vessel for subsequent dissolution. In either event, it has been found that upon complete removal of the stainless steel the uranium and plutonium values, while undergoing reaction with the HF-$O_2$ mixture as hereinbefore described, are not volatilized or otherwise lost during the decladding operation and may be subsequently recovered by any convenient means such as by solvent extraction. The only losses at this stage, if any, result from entrainment or carry-over due to evolution of any volatile fluorides such as $CrF_4$ or $CrF_5$. It should be noted, however, that actual presence of any $CrF_5$ in the product stream has not been detected, but, if present, would be in extremely small quantities; hence, essentially all ($>99\%$) of the uranium may be subsequently recovered as valuable product.

In another embodiment of this invention, the decladding operation may be used as a head-end treatment for a volatility process for spent nuclear fuels. There, for example, the stainless steel containing fuels, such as a stainless steel tubular element containin gsintered $UO_2$ pellets, may be first disposed in a fluidized bed which contains alumina as the fluidizing medium. After the bed is fluidized and brought up to a temperature between 550° C. and 650° C., a gaseous, anhydrous mixture of HF-$O_2$, preferably a 40 v/o HF-60 v/o $O_2$, is passed through the bed to effect removal of the stainless steel tubing. The flow rates of the gaseous HF-$O_2$ mixture are not critical to the practice of this invention, except insofar as the minimum gas flow required for fluidization is achieved. In general, superficial velocities of about 0.5 ft./sec. have been found to be quite suitable with velocities as high as 3.0 ft./sec. acceptable. It should be noted here that the destructive oxidation of the stainless steel does not occur preferentially, i.e., before the exposed core undergoes reaction with HF-$O_2$ mixture, but it has rather been found that the destructive attack of the tubular element is initiated at the end nearest the gas stream inlet and is progressively destroyed, cladding as well as core, until the whole fuel element is consumed. Beneficially, it has been found that the conversion of the $UO_2$ to $U_3O_8$ is accompanied by a swelling of the fuel core which causes extensive mechanical damage to the stainless steel cladding, thereby greatly aiding exposure of the fuel core and removal and disintegration of the stainless steel cladding.

It will be apparent to those skilled in the art that, due to the reaction between the stainless steel and the HF-$O_2$ mixture being exothermic, the interior of the fluidized bed may be higher than the measured wall temperature. Where this occurs it may be desirable to carry out the decladding operation at some temperature below about 650° C., such as about 600° C., to insure reasonable reaction rates.

After the cladding has been effectively removed and the contained fuel values, i.e., $UO_2$ and $PuO_2$, converted to the tetrafluoride or other intermediate reaction products ($U_3O_8$ or $UO_2F_2$), the HF-oxygen gaseous mixture is halted and the fuel values removed by volatility techniques, such as by passing gaseous fluorine or other fluorinating agents through the fluidized bed to convert the fuel values to the volatile hexavalent state. Separation of the uranium values from the plutonium values may be accomplished by any one of several conventional techniques, such as by sorption on solid fluorides, preferably NaF pellets.

The reactor vessel may be constructed of any structural material which has good corrosion resistant properties to fluoride attack. For example, tests indicate that nickel, or high nickel alloys, would be suitable as a construction material. Where the decladding operation would be coupled with a fuel recovery volatility, nickel has also been found to be suitable for a construction material. Of course it will be apparent that stainless steel, normally an excellent structural material, would not be suitable as a construction material and this would extend to any material having a substantial amount of chromium.

Further illustration of the quantitative aspects and procedures of the present invention is provided in the following examples. Example I demonstrates the effectiveness of HF-$O_2$ mixture on stainless steel containing bodies at gas flow rates of 100 and 200 ml. (STP)/min. when contacted at a temperature of 650° C.

Example I

Destructive oxidation of stainless steel specimens was effected as follows: A cylindrical specimen of 304L alloy (1" long x ¼" diameter) was suspended in a 2-inch-diameter nickel reactor vessel. Various gas compositions were passed respectively through the nickel reactor at a temperature of 650° C. and at flow rates of 100 and 200 ml. (STP)/min. The specimen was removed from the reactor periodically (hourly) and descaled by immersion in boiling 0.3 M ammonium oxalate. The reaction rate for the respective gas compositions was then determined by weight loss. The stainless steel specimen was analyzed and the products obtained from the destructive oxidation process were oxides of iron, nickel, and chromium. The oxygen utilization was found to vary inversely with the gas flow rate, with 28% utilization being obtained at a flow rate of 200 ml./min. The fluoride content of the product varied from 1% to 5%, indicating that the HF acted as a catalyst for the reaction and was not appreciably consumed. Results are shown in Table I below and graphically in the accompanying figure.

TABLE I

| Run | Flow Rate, ml./min. | Gas Composition, v/o | | Reaction Rate by Wt. Loss, mils/hr. |
|---|---|---|---|---|
| | | HF | O₂ | |
| 1 | 100 | 20 | 80 | 18 |
| 2 | 100 | 40 | 60 | 47 |
| 3 | 100 | 50 | 50 | 43 |
| 4 | 100 | 60 | 40 | 32 |
| 5 | 100 | 70 | 30 | 20 |
| 6 | 100 | 80 | 20 | 13 |
| 7 | 200 | 20 | 80 | 15 |
| 8 | 200 | 30 | 70 | 55 |
| 9 | 200 | 40 | 60 | 69 |
| 10 | 200 | 50 | 50 | 58 |
| 11 | 200 | 65 | 35 | 36 |

It may be seen from the results of Example I that the maximum oxidation rate (~69 mils/hr.) occurred with a gas composition of approximately 40 v/o HF in oxygen at a flow rate of 200 ml./min.

Example II demonstrates the effectiveness of a preferred 40 v/o HF in oxygen gas mixture on stainless steel at various temperatures.

Example II

The same procedure and techniques employed in Example I were used to determine the reaction rates for a 40 v/o HF in oxygen gas mixture on 304L stainless steel specimen at temperatures between 575°–650° C. and at a flow rate of 200 ml. (STP)/min. The results are shown in Table II below.

TABLE II

| Run | Temperature, °C. | Gas Composition, v/o | | Reaction Rate by Wt. Loss, mils/hr. |
|---|---|---|---|---|
| | | HF | O₂ | |
| 1 | 575 | 40 | 60 | 34 |
| 2 | 600 | 40 | 60 | 51 |
| 3 | 650 | 40 | 60 | 58 |

Example III demonstrates the applicability of this invention as a head-end treatment for a fluoride volatility fuel recovery process. It further illustrates a preferred method for carrying out the invention, incorporating a 40 v/o HF-60 v/o $O_2$ gas mixture.

Example III

A ½-inch-diameter nickel tube, serving as a reaction chamber, was loaded to a depth of approximately two inches with Norton, Grade RR-120, alumina (~5 grams). A $UO_2$ pellet weighing 1.106 grams and a piece of 304L stainless steel rod weighing 0.236 gram were placed in the alumina. The $UO_2$ represented 16% by weight of the bed contents which is approximately the weight fraction expected to be present in an actual production operation.

The alumina bed was fluidized with helium at a velocity of 0.5 ft./sec. while the temperature was increased to 625° C. When the operating temperature was achieved, the fluidizing gas was switched to a mixture consisting of 40% HF in oxygen and was passed through the bed at a rate of 0.5 ft./sec. to effect oxidation of the stainless steel present. This phase of the operation was continued for two hours after which the 40% HF-oxygen mixture flow was terminated and the bed examined. Examination of the bed contents indicated the stainless steel to be completely oxidized to its elemental constituents ($Fe_2O_3$, $Fe_3O_4$, NiO, $Cr_2O_3$) with less than 5% conversion to fluorides being detected.

The bed was again fluidized with helium at a velocity of 0.5 ft./sec. while the temperature was increased to 550° C. At this point the fluidizing gas was switched to fluorine and the bed was fluorinated for a period of two hours. The $UF_6$ thus produced was removed from the bed in the off-gas and selectively sorbed on a column of NaF pellets. Subsequent chemical analysis of the bed indicated that less than 1% of the uranium remained in the bed.

What is claimed is:

1. A method for dissolving stainless steel containing members comprising the step of contacting said member with a gaseous reaction mixture of anhydrous HF and an oxygen containing gas at a temperature between 550°–650° C., thereby oxidizing said stainless steel cladding.

2. The method of claim 1 wherein said gaseous reaction mixture comprises 40 volume percent HF in oxygen.

3. The method of claim 1 wherein said stainless steel containing members comprise stainless steel clad uranium or plutonium oxide fuel elements.

4. A method for decladding stainless steel clad uranium or plutonium oxide fuels comprising the steps of immersing said fuel in a fluidized bed, and thereafter fluidizing said fluidized bed with a gaseous reaction mixture of anhydrous HF and oxygen while maintaining said bed at a temperature within the range of 550°–650° C. to thereby effect an oxidation of said stainless steel cladding.

5. The method of claim 4 wherein said anhydrous HF and oxygen mixture comprises 40 volume percent HF in oxygen.

6. A method for the separation and recovery of fuel values from stainless steel clad spent uranium or plutonium oxide fuels comprising immersing said fuels in a fluidized bed, fluidizing said bed with an anhydrous gaseous reaction mixture comprising 40 volume percent HF in oxygen while maintaining said bed at a temperature within the range of 550°–650° C. to thereby effect an oxidation of said stainless steel cladding and thereafter separately recovering said uranium or plutonium oxide fuel values from said declad fuels.

7. The method of claim 6 wherein said recovery step comprises fluidizing said bed containing said declad fuels with an inert gas at a temperature of about 550° C., then passing gaseous fluorine through said bed while maintaining said bed at a temperature of about 550° C. to convert said therein-contained fuel values to the volatile hexafluoride and thereafter selectively sorbing said volatilized fuel product on a column of NaF pellets and recovering said fuel values.

8. The method of claim 6 wherein said recovery step comprises contacting said declad fuels with a strong inorganic acid to dissolve said declad fuels and thereafter recovering the dissolved fuel values by solvent extraction.

References Cited by the Examiner

Reactor Fuel Processing, vol. 7, No. 4, Fall 1964, p. 246.

CARL D. QUARFORTH, *Primary Examiner.*

BENJAMIN R. PADGETT, *Examiner.*

S. TRAUB, *Assistant Examiner.*